(12) United States Patent
Xiao et al.

(10) Patent No.: US 12,740,547 B2
(45) Date of Patent: Sep. 22, 2026

(54) METHOD AND DEVICE FOR NON-DESTRUCTIVE SORTING OF FERTILIZATION INFORMATION OF HATCHING EGGS BEFORE INCUBATION

(71) Applicant: SOUTH CHINA AGRICULTURAL UNIVERSITY, Guangzhou (CN)

(72) Inventors: Deqin Xiao, Guangzhou (CN); Jiaxin Zhou, Guangzhou (CN); Youfu Liu, Guangzhou (CN); Jianzhao Feng, Guangzhou (CN); Tanyu Lin, Guangzhou (CN); Shengjie Zhou, Guangzhou (CN); Miaobin Chen, Guangzhou (CN); Junqi Kang, Guangzhou (CN); Xiaohu Liu, Guangzhou (CN); Jianjun Yin, Guangzhou (CN)

(73) Assignee: SOUTH CHINA AGRICULTURAL UNIVERSITY, Guangzhou (CN)

( * ) Notice: Subject to any disclaimer, the term of this patent is extended or adjusted under 35 U.S.C. 154(b) by 204 days.

(21) Appl. No.: 18/751,241

(22) Filed: Jun. 22, 2024

(65) Prior Publication Data

US 2024/0341286 A1 Oct. 17, 2024

Related U.S. Application Data

(63) Continuation of application No. PCT/CN2023/132799, filed on Nov. 21, 2023.

(51) Int. Cl.
*A01K 43/00* (2006.01)
*A01K 43/04* (2006.01)
(Continued)

(52) U.S. Cl.
CPC .............. *A01K 43/00* (2013.01); *B07C 5/342* (2013.01)

(58) Field of Classification Search
CPC ........ A01K 43/00; A01K 43/04; B07C 5/342; G01N 21/359; G06F 18/241; G06N 3/04
See application file for complete search history.

(56) References Cited

U.S. PATENT DOCUMENTS 8,399,247 B2 * 3/2013 Phelps .................. A01K 43/00 435/235.1
10,206,375 B2 * 2/2019 De Ketelaere ......... A01K 43/00
(Continued)

FOREIGN PATENT DOCUMENTS

CN 110548697 A 12/2019
CN 111134047 A 5/2020
(Continued)

OTHER PUBLICATIONS

Zhihui, Zhu, et al. "Nondestructive detection of infertile hatching eggs based on spectral and imaging information." International Journal of Agricultural and Biological Engineering 8.4 (2015): 69-76. (Year: 2015).*
(Continued)

*Primary Examiner* — Gregory A Morse
*Assistant Examiner* — Ronde Lee Miller
(74) *Attorney, Agent, or Firm* — Birchwood IP

(57) ABSTRACT

The present invention discloses a method and a device for non-destructive sorting of fertilization information of hatching eggs before incubation. The method comprises the following steps: obtaining a first time sequence feature of hatching eggs and collecting spectrum data of the hatching eggs according to the first time sequence feature; preprocessing the spectrum data; selecting the preprocessed spectrum data to obtain a feature band; constructing a hatching egg classification neural network model and training the hatching egg classification neural network model; classifying the hatching egg information according to the feature band by using the trained hatching egg classification neural
(Continued)

network model to obtain fertilization information; and obtaining a second time sequence feature of the hatching eggs, and sorting the hatching eggs. The present invention improves the precision of detecting the fertilization information of hatching eggs.

4 Claims, 2 Drawing Sheets

(51) Int. Cl.

| | |
|---|---|
| ***B07C 5/342*** | (2006.01) |
| ***G01N 21/359*** | (2014.01) |
| ***G06F 18/241*** | (2023.01) |
| ***G06N 3/04*** | (2023.01) |

(56) References Cited

U.S. PATENT DOCUMENTS

| | | | | |
|---|---|---|---|---|
| 12,484,557 | B2 * | 12/2025 | Ninet | H04W 4/70 |
| 2021/0212296 | A1 * | 7/2021 | Knepper | A01K 45/00 |
| 2023/0090101 | A1 * | 3/2023 | Rasmussen | G01N 33/085<br>356/53 |
| 2024/0069000 | A1 * | 2/2024 | Hurlin | G01N 33/085 |
| 2024/0099275 | A1 * | 3/2024 | Ninet | A01K 41/023 |
| 2024/0407341 | A1 * | 12/2024 | Steiner | G01N 33/08 |

FOREIGN PATENT DOCUMENTS

| | | | |
|---|---|---|---|
| CN | 111802281 | B | 10/2020 |
| CN | 115511063 | A | 12/2022 |
| CN | 115812634 | B | 3/2023 |
| JP | 2020204570 | A | 12/2020 |

OTHER PUBLICATIONS

Li Jiangbo et al. “Application of spectral analysis technology in agricultural product quality and safety assessment” Spectral preprocessing, Mar. 31, 2021 (Mar. 31, 2021), pp. 88-93 2-4, 8 pp. 88-93.

* cited by examiner

METHOD AND DEVICE FOR NON-DESTRUCTIVE SORTING OF FERTILIZATION INFORMATION OF HATCHING EGGS BEFORE INCUBATION

CROSS-REFERENCE TO RELATED APPLICATIONS

This application is a continuation of co-pending International Patent Application No. PCT/CN2023/132799, filed on Nov. 21, 2023, which claims the priority and benefit of Chinese patent application number 202310132497.1, filed on Feb. 20, 2023 with China National Intellectual Property Administration, the entire contents of which are incorporated herein by reference.

TECHNICAL FIELD

The present invention relates to the field of sorting of hatching eggs before incubation, and specifically to a method and a device for non-destructive sorting of fertilization information of hatching eggs before incubation.

BACKGROUND

An information non-destructive detection method and a subsequent sorting device. For poultry farming enterprises, incubation of eggs is the first step of the entire industry. Due to the limitation of production environment and poultry variety, Beijing ducks can only achieve a 90% fertilization rate after mating twice under natural conditions (Yang Fangxi. Relationship Between Mating Behavior and Fertilization Rate of Beijing Ducks); and Nandan-Yao chickens have the average fertilization rate of 92.59% (Zhang Zhen. Experiment on Fertilization Rate of Hatching Eggs at Different Times After Two Consecutive Days of Insemination in Nandan-Yao Chickens). Therefore, 10% of unfertilized eggs are involved in incubation. These eggs not only occupy an incubation space and waste incubation resources, but also can deteriorate and smell in the process of incubation. The deteriorated unfertilized eggs are easily cracked and produce bacteria, which in turn affects the fertilized eggs, resulting in contamination of the fertilized eggs. Meanwhile, after the incubation is completed, these unfertilized hatching eggs cannot be eaten continuously and thus are wasted. In recent years, the main method for removing infertile eggs in the poultry industry in China is manual egg candling, and the infertile eggs are removed by the naked eyes of front-line workers. However, for large-scale farms, tens of thousands of hatching eggs in an incubation batch often require a lot of manpower if the infertile eggs are manually judged. In addition, the manual method is too subjective and prone to misjudgment and omission. Meanwhile, the wages of workers are also a burden for enterprises. Moreover, long detection time will also affect the embryonic development of the hatching eggs.

In order to solve the above problems, researchers at home and abroad have made a lot of research and have designed methods and devices for identifying unfertilized hatching eggs, but there are some problems. In the prior art, the detection of infertile eggs is achieved by using computer vision and deep learning; however, the computer vision technology can only accurately identify fertilized eggs and infertile eggs after hatching eggs are incubated. Since infertile eggs deteriorate quickly in the incubation environment, even if infertile eggs are identified after incubation, the infertile eggs can no longer enter the market; consequently, these infertile eggs are still wasted. In the prior art, the activity of hatching eggs is detected by using an X-ray device, which is similar to a computer vision technology, and even the X-ray device can detect the activity only when the embryo is developed for a longer time. In the prior art, a method based on fiber optic spectroscopy technology is used to detect the infertile eggs, and a convolutional neural network is used to model and judge fertilization information of the hatching duck eggs after spectrum data are collected. Although the device and method can judge the fertilization information of the hatching duck eggs before incubation, the spectrum information is not preprocessed after the spectrum data are collected, only 11 feature wavelength points are used, and some data with fertilization information are discarded. Although a good detection effect is achieved, the accuracy of the model can be further improved. Meanwhile, the device is only involved in the detection part without subsequent sorting process, and thus cannot be applied to industrial production.

SUMMARY

Aiming at the defects in the prior art, the method and the device for non-destructive sorting of fertilization information of hatching eggs before incubation provided by the present invention solve low detection precision of fertilization information of hatching eggs and inability to perform subsequent sorting of fertilized eggs and infertile egg.

In order to achieve the above objective, the present invention uses the following technical solutions.

A method for non-destructive sorting of fertilization information of hatching eggs before incubation comprises the following steps:

- S1: obtaining a first time sequence feature of hatching eggs and collecting spectrum data of the hatching eggs according to the first time sequence feature;
- S2: preprocessing the spectrum data in the step S1;
- S3: selecting the spectrum data preprocessed in the step S2 to obtain a feature band;
- S4: constructing a hatching egg classification neural network model and training the hatching egg classification neural network model;
- S5: classifying the hatching egg information according to the feature band in the step S3 by using the hatching egg classification neural network model trained in the step S4 to obtain fertilization information; and
- S6: obtaining a second time sequence feature of the hatching eggs, and sorting the hatching eggs according to the second time sequence feature, the first time sequence feature in the step S1 and the fertilization information obtained in the step S5.

Further, the step S2 comprises the following substeps:

- S21: performing standard normal variable transformation processing on the spectrum data; and
- S22: processing the spectrum data after the standard normal variable transformation processing obtained in the step S21 by using a linear filtering algorithm.

Further, the step S21 comprises the following substeps:

- S211: calculating an average value of the spectrum data in the step S1, which is represented as:

$$\overline{x} = \frac{\sum_{k=1}^{m} x_k}{m}$$

wherein $\bar{x}$ is an average value of a piece of spectrum data, x is a piece of spectrum data, m is the number of wavelength points, k=1, 2, . . . , m; and

S212: performing standard normal variable transformation processing on the spectrum data according to the average value of the spectrum data in the substep S211, which is represented as:

$$x_{snv} = \frac{x - \bar{x}}{\sqrt{\frac{\sum_{k=1}^{m}(x_k - \bar{x})^2}{m-1}}}$$

wherein xsnv is data of a piece of spectrum data after standard normal variable transformation processing.

Further, the step S22 comprises the following substeps:

S221: determining a size of a filtering window using a linear filtering algorithm; and

S222: shifting the spectrum data after the standard normal variable transformation processing obtained in the step S21 by using the filtering window in the smoothing substep S221, fitting the spectrum data in the window, and outputting the fitted data, which is represented as:

$$\bar{x}_k = \frac{1}{2w+1}\sum_{i=-w}^{+w} x_{snv}(k+i)$$

wherein $\bar{x}_k$ is a value after the spectrum data are fitted, $x_{snv(k+i)}$ is data after the spectrum data are subjected to standard normal variable transformation, k is a spectrum band position, and 2w+1 is a window size. Further, the step S3 comprises the following substeps:

S31: extracting bands from the spectrum data by using bootstrap sampling and weighted sampling to construct and store a submodel;

S32: calculating a prediction error of the submodel;

S33: calculating a regression coefficient of the submodel according to the prediction error;

S34: weighting the bands in the submodel according to the regression coefficient to obtain band weights;

S35: extracting a band of the submodel according to the band weights, and constructing and storing a next submodel;

S36: judging whether the submodel in the step S35 is a band; if yes, performing substep S37; otherwise, jumping to the substep S32; and

S37: performing cross validation on root mean square errors of the submodel stored in the substep S31 and the submodel stored in the substep S36, selecting a submodel with a minimum root mean square error, and determining a band in a subset as the feature band.

Further, in the step S4, the hatching egg classification neural network model comprises one position encoding layer, three encoding layers, one linear layer and one logic classification layer, wherein the position encoding layer performs position encoding on the feature band according to a band position of the feature band in an original spectrum; the three encoding layers are configured to perform dimension increase and dimension reduction on an input feature band with position information, and perform information fusion on the input feature band with position information, the linear layer is configured to perform linear change on the feature band after information fusion output by the three encoding layers, and output a feature band with a specified dimension; and the logic classification layer is configured to classify the feature band with the specified dimension output by the linear layer.

Further, the step S6 comprises the following substeps:

S61: obtaining a second time sequence feature of the hatching eggs;

S62: according to the second time sequence feature in the substep S61 and the first time sequence feature in the step S1, matching the hatching eggs to be sorted and the self-fertilization information thereof; and

S63: judging whether the fertilization information of the hatching eggs to be sorted is fertilization; if yes, skipping performing egg removing operation; otherwise, performing egg removing operation.

A device for non-destructive sorting of fertilization information of hatching eggs before incubation applied to the method comprises:

a sensor module, wherein the sensor module comprises a first position sensor, an integrator and a second position sensor, the first position sensor is configured to collect a first time sequence feature of hatching eggs and transmit the first time sequence feature to a core processing module, the integrator is configured to receive a collection instruction of the core processing module to collect spectrum information of hatching eggs and transmit the spectrum information to a detection device module through optical fibers, and the second position sensor is configured to collect a second time sequence feature of hatching eggs and transmit the second time sequence feature to the core processing module;

a motor module, wherein the motor module comprises a feeding conveyor belt motor, a fertilized egg sending conveyor belt motor and an infertile egg sending conveyor belt motor, the feeding conveyor belt motor is configured to receive a first instruction of the core processing module and feed the fertilized eggs into the sensor module to collect spectrum information of the fertilized eggs, the fertilized egg sending conveyor belt motor is configured to receive a second instruction of the core processing module and feed the fertilized eggs to a fertilized egg area, and the infertile egg sending conveyor belt motor is configured to receive a third transmission instruction of the core processing module and feed the infertile eggs to an infertile egg area;

a detection device module, wherein the detection device module comprises a near-infrared spectrometer, a halogen lamp light source and a display screen, the near-infrared spectrometer is configured to receive spectrum information transmitted by the sensor module to generate spectrum data and transmit the spectrum data to the core processing module, the halogen lamp light source is configured to provide a transmission light source, and the display screen is configured to display the working state of the entire device;

a core processing module, wherein the core processing module is configured to receive the first time sequence feature and the second time sequence feature collected by the sensor module, generate a first instruction according to the first time sequence feature and transmit the first instruction to the motor module, generate a collection instruction according to the first time sequence feature and transmit the collection instruction to the integrator in the sensor module and the near-infrared spectrometer in the detection device module, generate a second instruction or a third instruction according to the second time sequence feature and transmit the second instruction or the third instruction to the motor module, receive the spectrum data generated by the detection device module, obtain fertilization information according to the first time sequence feature, the second time sequence feature and the spectrum data, and send a fourth instruction to control an egg removing device; and an egg removing device, wherein the egg removing device is configured to receive the fourth instruction of the core processing module and send infertile eggs into the infertile egg sending conveyor belt motor in the motor module according to the fourth instruction. The beneficial effects of the present invention are as follows:

(1) the present invention uses a method for collecting spectrum data of fertilization information of hatching eggs based on a linear filtering algorithm, which solves difficult collection of spectrum data as well as signal offset and light scattering of original spectrum data in the industrial environment;

(2) the present invention uses a method for detecting fertilization information of hatching eggs before incubation based on spectral feature fusion of a hatching egg classification neural network model, which reduces the amount of spectrum data and improves the detection speed of the detection model through feature band selection; in addition, the present invention uses the hatching egg classification neural network model, which improves the detection precision of the model, improves the working efficiency of the entire production line through the matching of the wavelength selection algorithm and the hatching egg classification neural network model, and reduces the cost of false detection and missed detection;

(3) the present invention combines the time sequence information of hatching eggs on the production line, can complete the entire process of detecting and sorting the information of hatching eggs before incubation, and solves the problem of only detection but no sorting in the past; and (4) the present invention adopts a line production sorting strategy based on time sequence control, so that the entire detection, classification and selection processes can be automatically performed through the cooperation of the spectrum system and the detection algorithm, thereby greatly reducing the personnel cost.

DETAILED DESCRIPTION OF EMBODIMENTS

The following description of the specific embodiments of the present invention is provided to facilitate the understanding of the present invention by those skilled in the art, however, it should be understood that the present invention is not limited to the scope of the specific embodiments, and for those of ordinary skill in the art, various changes that are made without departing from the spirit and scope of the present invention as defined and determined by the appended claims are apparent, and all inventions and creations that are made by using the concept of the present invention are within the protective scope.

Figure 1:
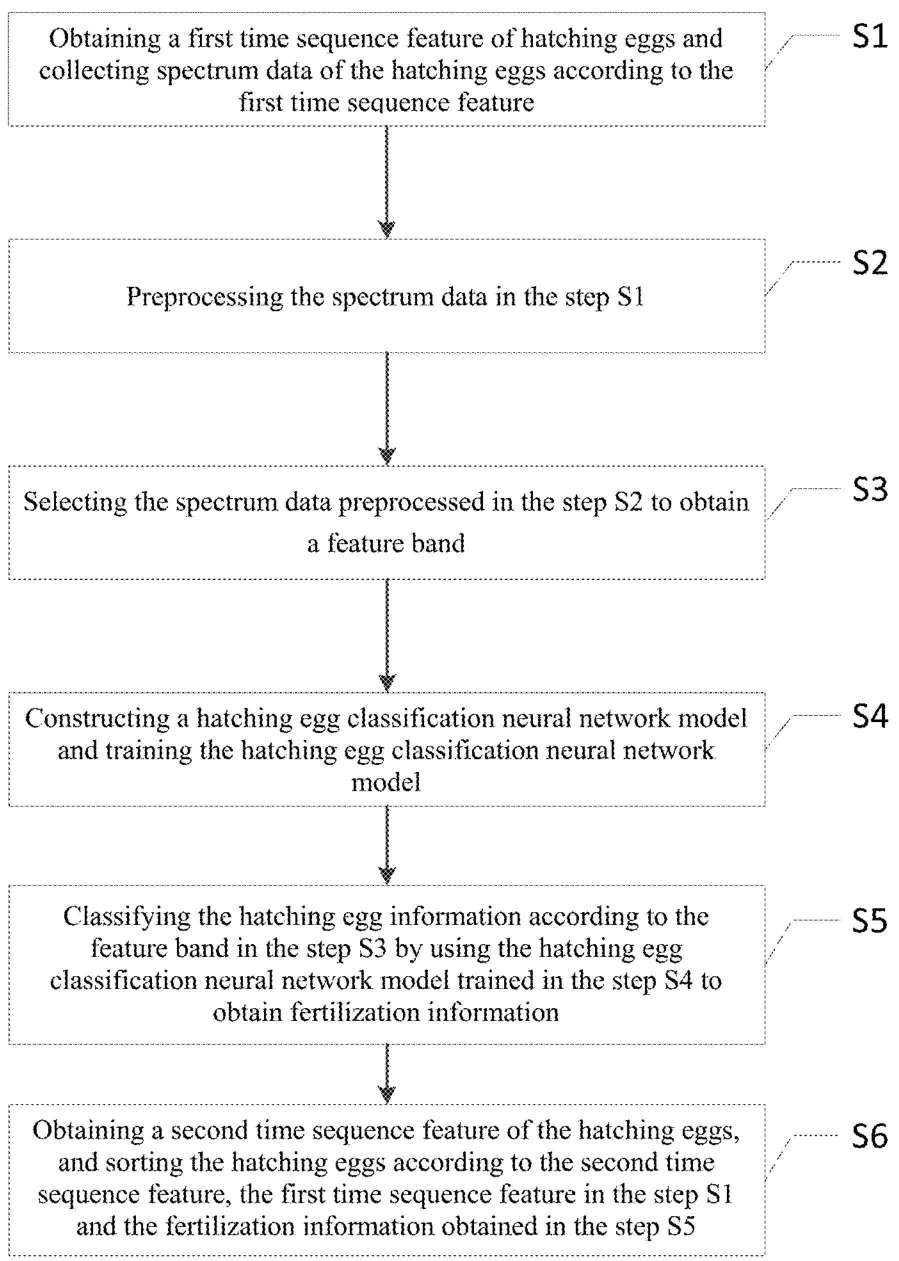
FIG. 1 is a flowchart of a method for non-destructive sorting of fertilization information of hatching eggs before incubation.

As shown in FIG. 1, a method for non-destructive sorting of fertilization information of hatching eggs before incubation comprises steps S1-S6.

S1: a first time sequence feature of hatching eggs is obtained, and spectrum data of the hatching eggs are collected according to the first time sequence feature.

In an optional embodiment of the present invention, a conveyor belt conveys hatching eggs to an area where a first position sensor is located. The first position sensor collects a first time sequence feature of hatching eggs and transmits the first time sequence feature to a core processing module. The core processing module receives the first time sequence feature, and generates a first instruction and a collection instruction. The conveyor belt receives a first instruction and conveys hatching eggs to an area where an integrator in a sensor module is located. The integrator and a near-infrared spectrograph in the detection device module receive the collection instruction and are turned on. The integrator collects the spectrum information of the hatching eggs and transmits the spectrum information to the detection device module through optical fibers to generate spectrum data, and the detection device module transmits the collected and generated spectrum data to the core processing module.

Specifically, when the hatching eggs are moved to the front of the integrator, the collection starts, and the integrator continuously collects 15 pieces of spectrum information in an integration time of 0.005 s. The front and back 5 pieces of spectrum information are saturated, so that the front and back 5 pieces of spectrum information are removed, and the middle 5 pieces of spectrum information are averaged to obtain the required spectrum information.

S2: the spectrum data in the step S1 is preprocessed.

In an optional embodiment of the present invention, the core processing module obtains the spectrum data and then performs preprocessing by using standard normal variance and smoothing, and denoises the spectrum data to eliminate signal offset and light scattering in the original spectrum.

The step S2 comprises the following substeps:

S21: performing standard normal variable transformation processing on the spectrum data.

The step S21 comprises the following substeps:

S211: calculating an average value of the spectrum data in the step S1, which is represented as:

$$\bar{x} = \frac{\sum_{k=1}^{m} x_k}{m}$$

wherein $\bar{x}$ is an average value of a piece of spectrum data, x is a piece of spectrum data, m is the number of wavelength points, k=1, 2, . . . , m.

S212: performing standard normal variable transformation processing on the spectrum data according to the average value of the spectrum data in the substep S211, which is represented as:

$$x_{snv} = \frac{x - \bar{x}}{\sqrt{\frac{\sum_{k=1}^{m} (x_k - \bar{x})^2}{m - 1}}}$$

wherein $x_{snv}$ is data of a piece of spectrum data after standard normal variable transformation processing.

S22: processing the spectrum data after the standard normal variable transformation processing obtained in the step S21 by using a linear filtering algorithm.

The step S22 comprises the following substeps:

S221: determining a size of a filtering window using a linear filtering algorithm; and S222: shifting the spectrum data after the standard normal variable transformation processing obtained in the step S21 by using the filtering window in the smoothing substep S221, fitting the spectrum data in the window, and outputting the fitted data, which is represented as:

$$\overline{x}_k = \frac{1}{2w+1}\sum_{i=-w}^{+w} x_{snv}(k+i)$$

wherein $\overline{x}_k$ is a value after the spectrum data are fitted, $x_{snv(k+i)}$ is data after the spectrum data are subjected to standard normal variable transformation, k is a spectrum band position, and 2w+1 is a window size.

S3: the spectrum data preprocessed in the step S2 are selected to obtain a feature band.

In an optional embodiment of the present invention, after the spectrum data of the hatching eggs are preprocessed, the preprocessed spectrum data are selected by using a feature wavelength selection algorithm to obtain a feature band.

The step S3 comprises the following substeps:

S31: extracting bands from the spectrum data by using bootstrap sampling and weighted sampling to construct and store a submodel.

S32: calculating a prediction error of the submodel.

S33: calculating a regression coefficient of the submodel according to the prediction error.

S34: weighting the bands in the submodel according to the regression coefficient to obtain band weights.

S35: extracting a band of the submodel according to the band weights, and constructing and storing a next submodel.

S36: judging whether the submodel in the step S35 is a band; if yes, performing substep S37; otherwise, jumping to the substep S32.

S37: performing cross validation on root mean square errors of the submodel stored in the substep S31 and the submodel stored in the substep S36, selecting a submodel with a minimum root mean square error, and determining a band in a subset as the feature band.

S4: a hatching egg classification neural network model is constructed and trained.

Figures 2, 3:
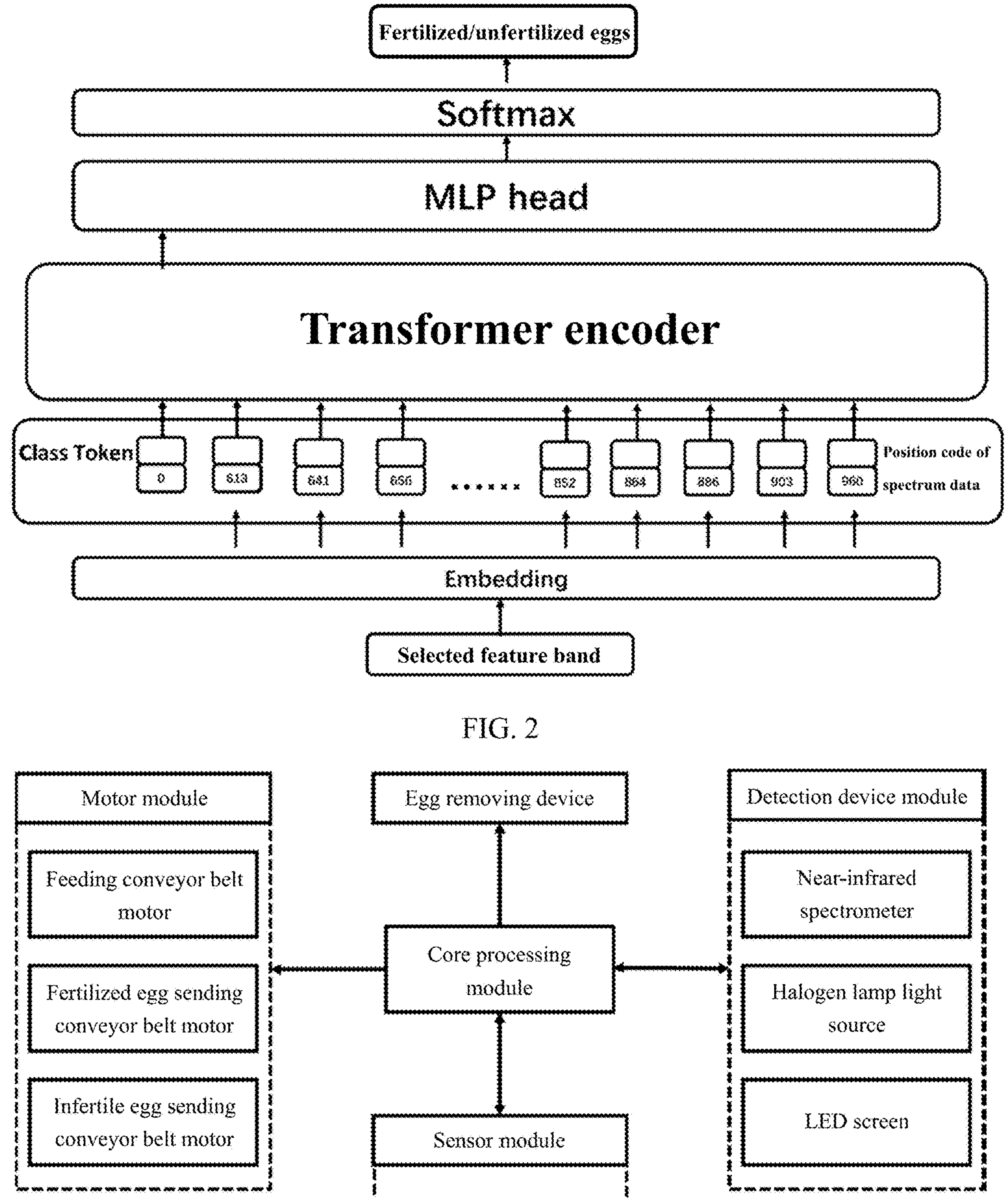
FIG. 2 is a structural diagram of a hatching egg classification neural network model.
FIG. 3 is a control logic diagram of a device for non-destructive sorting of fertilization information of hatching eggs before incubation.

As shown in FIG. 2, the hatching egg classification neural network model comprises one position encoding layer, three encoding layers, one linear layer and one logic classification layer, wherein the position encoding layer performs position encoding on the feature band according to a band position of the feature band in an original spectrum; the three encoding layers are located in the Transformer encoder and configured to perform dimension increase and dimension reduction on an input feature band with position information, and perform information fusion on the input feature band with position information, the linear layer is located in the MLP head layer and configured to perform linear change on the feature band after information fusion output by the three encoding layers, and output a feature band with a specified dimension; and the logic classification layer is Softmax layer and configured to classify the feature band with the specified dimension output by the linear layer.

In an optional embodiment of the present invention, since the spectrum data is one-dimensional, using ordinary convolution requires converting one-dimensional data into two-dimensional data through matrix transformation; or one-dimensional convolution kernel is used, which will change the structure of the original information, consequently, the position information of the spectrum is not focused, part of the information is lost, and the detection precision is insufficient.

According to the hatching egg classification neural network model used in the present invention, the preprocessing of feature band selection is performed by the feature wavelength selection algorithm, the dimensionality of parameters is only 68 dimensions, the dimensionality is small, and therefore parameter explosion cannot be caused.

Meanwhile, the present invention uses the position encoding layer to emphasize the position information of the spectrum data, so that the selected feature band has accurate position information, and the precision and the robustness of the hatching egg classification neural network model are improved. The conventional Transformer network uses a set of continuous values to record the position relationship of input data, which loses the band position information of the spectrum data. In order to characterize the position information between feature spectra, the present invention takes the band position of the feature band in the original spectrum as the position code of the spectrum data. A first position code is Class Token, which is used to represent the global information of the spectrum. The position of this code is 0, the value of this code is 0, and this code is continuously updated along with the training of the network. The updating process is a reverse propagation process, and starting from an output layer, errors correct the weights of all layers according to a gradient descent method, which propagates forward in sequence.

Specifically, in the previous work, the present invention needs to use a large-scale hatching egg data set to train a hatching egg classification neural network model. Therefore, the present invention needs to collect more than 2000 pieces of spectrum data of hatching egg firstly to construct a data set of a training network. After manual classification, the hatching eggs are classified into infertile eggs and fertilized eggs. Finally, according to the error calculated by the loss function cross entropy of the hatching egg classification neural network model, back propagation is performed on the errors, and the network parameters are updated. The formula of the loss function is as follows:

$$L = \frac{1}{n}\sum_{i=1}^{n}\left(-\sum_{j=1}^{C} y_{i,j}\log p_{i,j}\right)$$

wherein n is the number of training rounds, C is the number of the prediction types, $y_{i,j}$ is a real label of an $i^{th}$ sample on a $j^{th}$ type, and $p_{i,j}$ is a prediction probability of an $i^{th}$ sample to a $j^{th}$ class.

The data sets are divided into a training set, a test set and a validation set in a ratio of 3:1:1.

S5: the hatching egg information is classified according to the feature band in the step S3 by using the hatching egg classification neural network model trained in the step S4 to obtain fertilization information.

S6: a second time sequence feature of the hatching eggs is obtained, and the hatching eggs are sorted according to the second time sequence feature, the first time sequence feature in the step S1 and the fertilization information obtained in the step S5.

In an optional embodiment of the present invention, when the first time sequence feature of the hatching egg is obtained by the core processing module in the present invention, a timestamp of the hatching egg passing through the first position sensor is obtained, and the hatching egg is marked as an Nth hatching egg passing through the first position sensor. The core processing module calculates a timestamp of the hatching egg arriving at a second position sensor based on a conveyor belt speed. When the hatching egg passes through the second position sensor, the core processing module compares the hatching egg with the Nth hatching egg passing through the second position sensor, compares the current timestamp, confirms the position of the hatching egg by using the double information, and associates the fertilization information of the hatching egg with the time sequence information.

The core processing module generates a fourth instruction according to the first time sequence feature, the second time sequence feature and fertilization information of the hatching eggs, controls the egg removing device to send the infertile eggs to an infertile egg sending conveyor belt according to the fourth instruction, and sends the fertilized eggs to a fertilized egg sending conveyor belt. The core processing module generates a second instruction or a third instruction according to the second time sequence feature. If the second instruction is generated, the core processing module controls the fertilized egg sending conveyor belt motor to send the fertilized eggs to the fertilized egg area through the second instruction; and if the third instruction is generated, the core processing module controls the infertile egg sending conveyor belt motor to send the infertile eggs to the infertile egg area through the third instruction.

The step S6 comprises the following substeps:

S61: obtaining a second time sequence feature of the hatching eggs.

The conveyor belt conveys hatching eggs to an area where the second position sensor is located. The second position sensor collects a second time sequence feature of hatching eggs and transmits the second time sequence feature to a core processing module.

S62: according to the second time sequence feature in the substep S61 and the first time sequence feature in the step S1, matching the hatching eggs to be sorted and the self-fertilization information thereof.

S63: judging whether the fertilization information of the hatching eggs to be sorted is fertilization; if yes, skipping performing egg removing operation; otherwise, performing egg removing operation.

After the hatching eggs are moved to the second position sensor, the core processing module transmits a fourth instruction to the egg removing device according to the first time sequence feature, the second time sequence feature and the fertilization information of the hatching eggs. If the infertile eggs are determined, the egg removing device is turned on and lifts the cross bar, and the infertile eggs are sent through the infertile egg sending conveyor belt; and if the fertilized eggs are determined, the egg removing device is not turned on, and the fertilized eggs are sent through the fertilized egg sending conveyor belt.

As shown in FIG. 3, a device for non-destructive sorting of fertilization information of hatching eggs before incubation applied to the method comprises a sensor module, a motor module, a detection device module, a core processing module and an egg removing device.

Specifically, the sensor module comprises a first position sensor, an integrator and a second position sensor, the first position sensor is configured to collect a first time sequence feature of hatching eggs and transmit the first time sequence feature to a core processing module, the integrator is configured to receive a collection instruction of the core processing module to collect spectrum information of hatching eggs and transmit the spectrum information to a detection device module through optical fibers, and the second position sensor is configured to collect a second time sequence feature of hatching eggs and transmit the second time sequence feature to the core processing module.

In an optional embodiment of the present invention, when the integrator collects spectrum information, the present invention should avoid interference from external light and needs to keep the spectrum information collection space in a light-free condition.

The conveyor belt conveys hatching eggs to an area where the first position sensor is located. The first position sensor collects a first time sequence feature of hatching eggs and transmits the first time sequence feature to a core processing module.

The conveyor belt conveys hatching eggs to an area where the integrator is located. The integrator collects the spectrum information of the hatching eggs and transmits the spectrum information to the detection device module through optical fibers.

The conveyor belt conveys hatching eggs to an area where the second position sensor is located. The second position sensor collects a second time sequence feature of hatching eggs and transmits the second time sequence feature to a core processing module.

The motor module comprises a feeding conveyor belt motor, a fertilized egg sending conveyor belt motor and an infertile egg sending conveyor belt motor, wherein the feeding conveyor belt motor is configured to receive a first instruction of the core processing module and feed the fertilized eggs into the sensor module to collect spectrum information of the fertilized eggs, the fertilized egg sending conveyor belt motor is configured to receive a second instruction of the core processing module and feed the fertilized eggs to a fertilized egg area, and the infertile egg sending conveyor belt motor is configured to receive a third transmission instruction of the core processing module and feed the infertile eggs to an infertile egg area.

In an optional embodiment of the present invention, a light-tight housing made of stainless steel material is used to enclose the conveyor belt, and an opening of the housing needs to fit with the edges of the light source and the optical fibers to prevent light leakage. Meanwhile, in order to ensure that no external light leaks into the spectrum information collection space when the conveyor belt is running, two layers of light-tight rubber curtains are respectively designed at the front and the rear of the conveyor belt, so that the interference of the external light on the detection result is reduced to the maximum extent. In addition, the conveyor belt in the present invention is provided with a limiter configured to ensure that the hatching eggs are in a fixed posture.

The detection device module comprises a near-infrared spectrometer, a halogen lamp light source and a display screen, wherein the near-infrared spectrometer is configured to receive spectrum information transmitted by the sensor module to generate spectrum data and transmit the spectrum data to the core processing module, the halogen lamp light source is configured to provide a transmission light source, and the display screen is configured to display the working state of the entire device.

In an optional embodiment of the present invention, the near-infrared spectrometer in the detection device module receives the collection instruction transmitted by the core processing module and is turned on, the near-infrared spectrometer is connected to the integrator in the sensor module through optical fibers, and the integrator transmits the collected spectrum information to the near-infrared spectrometer through the optical fibers to generate spectrum data. The near-infrared spectrometer transmits the spectrum data to the core processing module.

The core processing module is configured to receive the first time sequence feature and the second time sequence feature collected by the sensor module, generate a first instruction according to the first time sequence feature and transmit the first instruction to the motor module, generate a collection instruction according to the first time sequence feature and transmit the collection instruction to the integrator in the sensor module and the near-infrared spectrometer in the detection device module, generate a second instruction or a third instruction according to the second time sequence feature and transmit the second instruction or the third instruction to the motor module, receive the spectrum data generated by the detection device module, obtain fertilization information according to the first time sequence feature, the second time sequence feature and the spectrum data, and send a fourth instruction to control an egg removing device.

The egg removing device is configured to receive the fourth instruction of the core processing module and send infertile eggs into the infertile egg sending conveyor belt motor in the motor module according to the fourth instruction.

In an optional embodiment of the present invention, when the egg removing device executes the fourth instruction of the core processing module, if the hatching eggs are fertilized eggs, no operation is executed; and if the hatching eggs are infertile eggs, the egg removing device lifts the cross bar and ejects the infertile eggs into the infertile egg sending conveyor belt.

It will be appreciated by those of ordinary skill in the art that the embodiments described herein are intended to help readers understand the principles of the present invention, and it should be understood that the protection scope of the present invention is not limited to such specific descriptions and embodiments. Those of ordinary skill in the art may make various other specific modifications and combinations based on the technical inspirations disclosed in the present invention without departing from the essence of the present invention, and these modifications and combinations are still within the protection scope of the present invention.

What is claimed is:

1. A method for non-destructive sorting of fertilization information of hatching eggs before incubation, comprising the following steps:

S1: obtaining a first time sequence feature of hatching eggs and collecting spectrum data of the hatching eggs according to the first time sequence feature;

S2: preprocessing the spectrum data in the step S1;

wherein the step S2 comprises the following substeps:

S21: performing standard normal variable transformation processing on the spectrum data; and

S22: processing the spectrum data after the standard normal variable transformation processing obtained in the step S21 by using a linear filtering algorithm;

wherein the step S22 comprises the following substeps:

S221; determining a size of a filtering window using a linear filtering algorithm; and

S222: shifting the spectrum data after the standard normal variable transformation processing obtained in the step S21 by using the filtering window in the smoothing substep S221, fitting the spectrum data in the window, and outputting the fitted data, which is represented as:

$$\overline{x}_k = \frac{1}{2w+1}\sum_{i=-w}^{+w} x_{snv}(k+i)$$

wherein $\overline{x}_k$ is a value after the spectrum data are fitted, $x_{snv(k+i)}$ is data after the spectrum data are subjected to standard normal variable transformation, k is a spectrum band position, and $2w+1$ is a window size;

S3: selecting the spectrum data preprocessed in the step S2 to obtain a feature band;

S4: constructing a hatching egg classification neural network model and training the hatching egg classification neural network model;

wherein the hatching egg classification neural network model comprises one position encoding layer, three encoding layers, one linear layer and one logic classification layer, the position encoding layer performs position encoding on the feature band according to a band position of the feature band in an original spectrum; the three encoding layers are configured to perform dimension increase and dimension reduction on an input feature band with position information, and perform information fusion on the input feature band with position information, the linear layer is configured to perform linear change on the feature band after information fusion output by the three encoding layers, and output a feature band with a specified dimension; and the logic classification layer is configured to classify the feature band with the specified dimension output by the linear layer;

S5: classifying the hatching egg information according to the feature band in the step S3 by using the hatching egg classification neural network model trained in the step S4 to obtain fertilization information; and

S6: obtaining a second time sequence feature of the hatching eggs, and sorting the hatching eggs according to the second time sequence feature, the first time sequence feature in the step S1 and the fertilization information obtained in the step S5.

2. The method for non-destructive sorting of fertilization information of hatching eggs before incubation according to claim 1, wherein the step S21 comprises the following substeps:

S211: calculating an average value of the spectrum data in the step S1, which is represented as:

$$\overline{x} = \frac{\sum_{k=1}^{m} x_k}{m}$$

wherein $\overline{x}$ is an average value of a piece of spectrum data, x is a piece of spectrum data, m is the number of wavelength points, k=1, 2, . . . , m; and

S212: performing standard normal variable transformation processing on the spectrum data according to the average value of the spectrum data in the substep S211, which is represented as:

$$x_{snv} = \frac{x - \bar{x}}{\sqrt{\frac{\sum_{k=1}^{m} (x_k - \bar{x})^2}{m - 1}}}$$

wherein $x_{snv}$ is data of a piece of spectrum data after standard normal variable transformation processing.

3. The method for non-destructive sorting of fertilization information of hatching eggs before incubation according to claim 1, wherein the step S3 comprises the following substeps:

S31: extracting bands from the spectrum data by using bootstrap sampling and weighted sampling to construct and store a submodel;

S32: calculating a prediction error of the submodel;

S33; calculating a regression coefficient of the submodel according to the prediction error;

S34: weighting the bands in the submodel according to the regression coefficient to obtain band weights;

S35: extracting a band of the submodel according to the band weights, and constructing and storing a next submodel;

S36: judging whether the submodel in the step S35 is a band; if yes, performing substep S37; otherwise, jumping to the substep S32; and S37: performing cross validation on root mean square errors of the submodel stored in the substep S31 and the submodel stored in the substep S36, selecting a submodel with a minimum root mean square error, and determining a band in a subset as the feature band.

4. The method for non-destructive sorting of fertilization information of hatching eggs before incubation according to claim 1, wherein the step S6 comprises the following substeps:

S61: obtaining a second time sequence feature of the hatching eggs;

S62: according to the second time sequence feature in the substep S61 and the first time sequence feature in the step S1, matching the hatching eggs to be sorted and the self-fertilization information thereof; and S63: judging whether the fertilization information of the hatching eggs to be sorted is fertilization; if yes, skipping performing egg removing operation; otherwise, performing egg removing operation.

* * * * *